Hall & Merrick.
Thread Dressing Mach.

No. 3,734. Fig. 1. Reissued Nov. 16, 1869.

Witnesses.
J. B. Carpenter
J. S. Parker

Inventors.
Origin Hall
Timothy Merrick

United States Patent Office.

ORIGIN HALL, OF WILLIMANTIC, CONNECTICUT, AND TIMOTHY MERRICK, OF HOLYOKE, MASSACHUSETTS.

*Letters Patent No.* 29,690, *dated August* 21, 1860; *reissue No.* 3,734, *dated November* 16, 1869.

IMPROVEMENT IN MACHINES FOR DRESSING AND FINISHING THREAD.

The Schedule referred to in these Letters Patent and making part of the same.

*To all whom it may concern:*

Be it known that we, ORIGIN HALL, of the town of Willimantic, county of Windham, and State of Connecticut, and TIMOTHY MERRICK, of Holyoke, in the county of Hampden, and State of Massachusetts, both formerly of West Willington, in the county of Tolland, and State of Connecticut, have invented certain new and useful Improvements in Machinery for Dressing and Finishing Sewing-Thread, or other threads or yarns; and we do hereby declare that the following is a full, clear, and exact description of the same, reference being had to the accompanying drawings, forming part of this specification, in which—

Figure 1 represents a longitudinal vertical section, taken just within one of the side frames of a machine, exhibiting all our improvements.

Similar letters of reference indicate corresponding parts in the several figures.

To enable persons skilled in the art to make and use our invention, we will proceed to describe its construction and operation A is the framing of the machine.

B is the brush-cylinder, the journals of which are fitted to turn in suitable bearings supported on the said framing.

C $C^1$ $C^2$ $C^3$ are rollers, which conduct the thread as it comes from the size-boxes into contact with the brush-cylinder, said rollers being at equal distances apart near to the cylinders, and parallel therewith.

Figure 2:
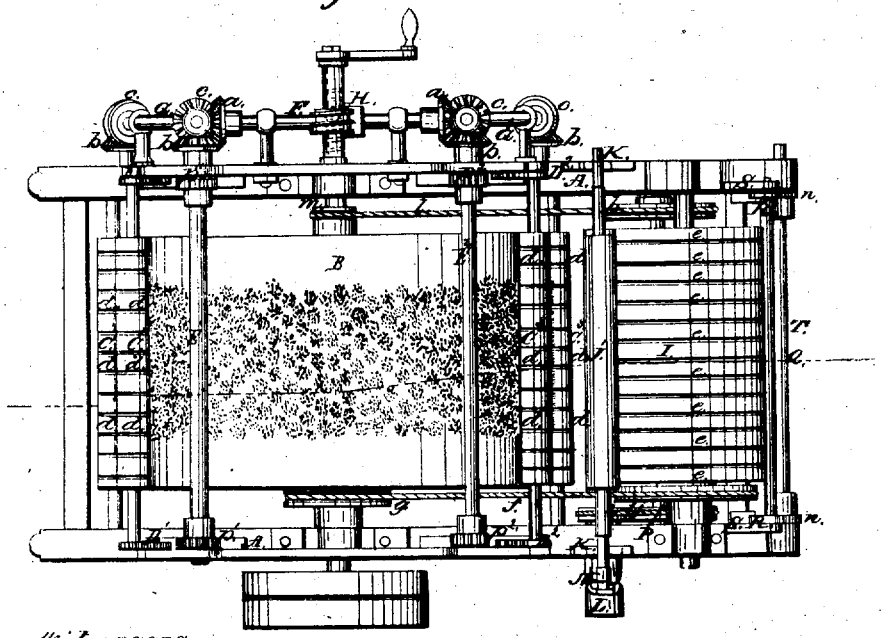
Figure 2 is a plan of the same.

The sizing-apparatus is not shown, but a thread is shown in red color in figs. 1 and 2.

The rollers derive motion from the friction of the thread passing in contact with them.

The threads pass under the roller C, over rollers $C^1$ and $C^2$, and under $C^3$, and by that means each thread is caused to come in contact with the cylinder in three places, and to be operated upon by the cylinder three times.

The said rollers have their journals fitted to bearings in slides D, $D^1$, $D^2$, and $D^3$, fitted to suitable guides in the framing, and the said slides are provided with toothed racks, to gear with pinions $p$ $p^1$ $p^2$ $p^3$ on four shafts, E, $E^1$, $E^2$, and $E^3$, for the purpose of enabling the said rollers to be adjusted further from or nearer to the cylinder, that the thread may enter more or less deeply into the brushes, as may be desired. These shafts, E, $E^1$, $E^2$, and $E^3$, are geared together by a train of shafts F G G′ and bevel-gears *a a b b c c*, that all may be operated simultaneously, by turning an endless screw-shaft, H, which gears with a worm-wheel on the shaft F.

The several rollers C, $C^1$, $C^2$, and $C^3$ have, at regular and suitable intervals apart, small grooves *d d*, to receive and guide the threads.

The threads are not directed from the grooves in one roller to the grooves in the same line in the next roller, but are passed to grooves either to the right or left, and hence are prevented from making a series of wet streaks in the brushes, and leaving other parts untouched, and thus bringing all parts of the brush-cylinder into operation, and thus preventing any part of it from becoming wet or damp enough to interfere with the success of the operation. This mode of directing the threads is illustrated in fig. 2.

The thread, in leaving one roller, is caused, by the action of the brushes at the next place of contact, to assume, between that roller and said place of contact, a line parallel with the planes of revolution of the cylinder, but from said place of contact to the next roller, it takes an oblique direction, as shown in fig. 2.

The arrangement of the conducting-rollers in relation to the brush-cylinder, and the offices of the grooves in the said rollers, are fully described in, and relate more especially to the Letters Patent granted us, bearing date August 7, 1860, and numbered 29,484.

I is the polishing-cylinder, having its journals fitted to stationary bearings, supported on the frame A; said cylinder being made of metal, hollow, and is heated by steam, admitted through hollow journals, in the manner common to calender-rollers, and having small well-polished grooves *e e* in its periphery, to receive the threads, which are conducted to and in contact with the said cylinder, on their way from the brush-cylinder to the spools, or other contrivances by which they are taken up. This cylinder is driven by a belt, *f*, from a pulley, *g*, on the shaft of the brush-cylinder, at such a velocity that its peripherical surface moves much faster than the threads passing over it, and by the friction of its rapidly-moving smooth surface upon the threads, which are not quite dry, when they arrive at it, dries and gives them a beautiful polish or glaze.

By having grooves *e* upon the cylinder I, each thread will be kept separate, and more or less accurately rounded, by contact under pressure, with the surfaces of the grooves, and at the same time a much larger proportion of the surface of the thread will be exposed to the action of the heat than if the rollers were plain.

J and J′ are a pair of plain rollers, between which the threads pass on their way from the brush-cylinder B to the polishing-cylinder I, the lower roller J being fitted to stationary bearings in standards K K, erected on the framing A, and the upper one, J′, resting on J, and having its journals simply fitted to guides in the aforesaid standards.

The pressure produced by the upper roller J′ should be sufficient to make the thread turn both rollers as it is drawn between them.

Figure 3:
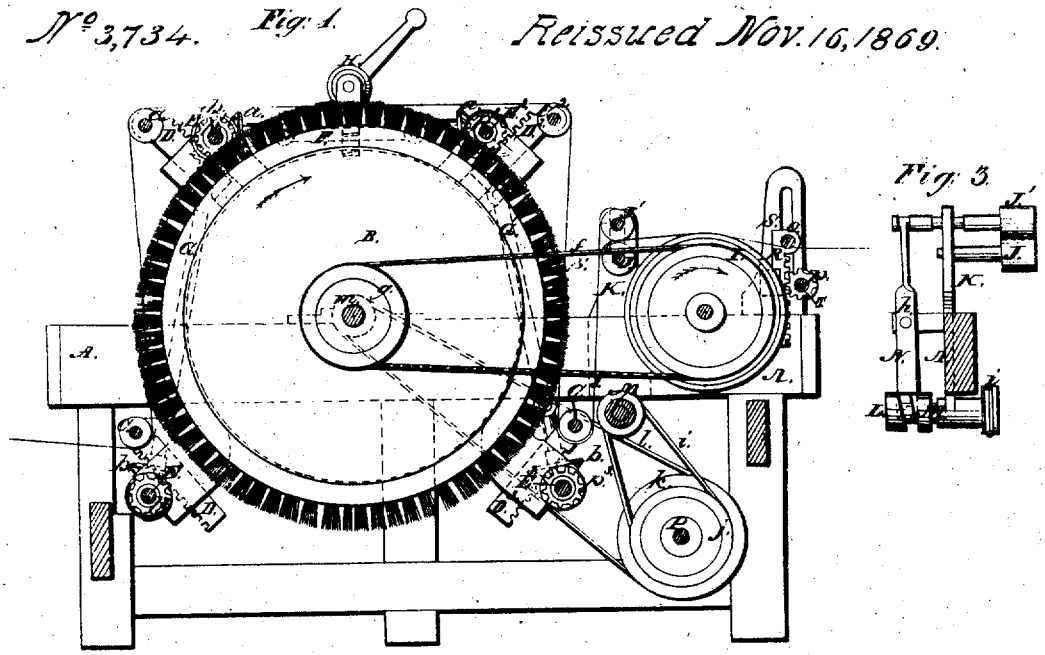
Figure 3 is a transverse elevation of a portion of the machine.

The upper roller J′ has imparted to it a regular reciprocating longitudinal motion, while the machine is in operation, by means of a cam, L, (best shown in fig. 3,) on a short shaft, M, fitted to rotate in a stationary box, some distance below the rollers J and J′, the said cam operating upon the lower end of a lever, N, which works on a fixed fulcrum, *h*, and whose upper end is forked, and fitted to a groove in the axle of the roller J′.

The reciprocating motion thus given to the said roller J′, while the lower one, J, has no longitudinal motion, causes the thread to receive a rapid rolling motion, while it is passing in contact with the surface of the polishing-cylinder, and this rolling motion of the thread causes every portion of its circumferential surface to be presented to the action of the surface of the cylinder.

The cam-shaft M is driven by a belt, *i*, from a pulley, *j*, on a shaft, P, arranged below the polishing-cylinder, said shaft P having another pulley, K, which receives the motion through a belt, *l*, from a pulley, *m*, on the brush-cylinder shaft, which is the shaft from which all the moving-parts of the machine derive motion, except the rollers, which are driven by the action of the moving thread.

Q is a roller, which assists the rollers J and J′ to confine the threads to the surface of the polishing-cylinder, and conducts the threads therefrom to the spools, or other contrivances, (not shown in the drawing,) on which they are taken up, said roller having its journals fitted to bearings in two slides R R, which are fitted to guides in two standards S S, erected on the front end of the frame A A.

The slides R R are furnished with toothed racks, to gear with pinions *n n* on a shaft, T, which works in fixed bearings in the standards S S, and the said shaft is furnished with a handle, by which it can be turned, to raise and lower the slides R R and roller Q, to make the threads bear upon a less or greater portion of the circumference of the polishing-cylinder, as may be desired.

We claim as new, and desire to secure by Letters Patent—

1. In combination with a brush-cylinder, the heated and rapidly-revolving metallic cylinder I, substantially as shown and described, for the purpose specified.

2. In combination with the hot polishing-cylinder, the rollers J and J′, and the adjustable roller, Q, or their equivalents, by means of which the passing threads may be forced or actuated into a greater or lesser degree of contact with the surface of said cylinder, substantially as shown and described, for the purposes specified.

3. In combination with the roller J, the vibrating roller J′, when arranged to operate in combination with a hot polishing-cylinder, in a brush-cylinder machine, substantially as shown and described.

4. A heated metallic cylinder, having in its peripherical surface, grooves of a proper size, and well polished, in combination with a brush-cylinder, as and for the purposes specified.

In testimony whereof, we have hereunto subscribed on this, the 31st day of August, A. D. 1869.

TIMOTHY MERRICK.
ORIGIN HALL.

Witnesses:
EDWIN A. BARROWS,
D. F. TERRY.